June 30, 1970     E. H. SMITH, JR     3,518,624
COMBINATION SIGNAL LIGHT FOR MOTOR VEHICLES
Filed Oct. 18, 1967
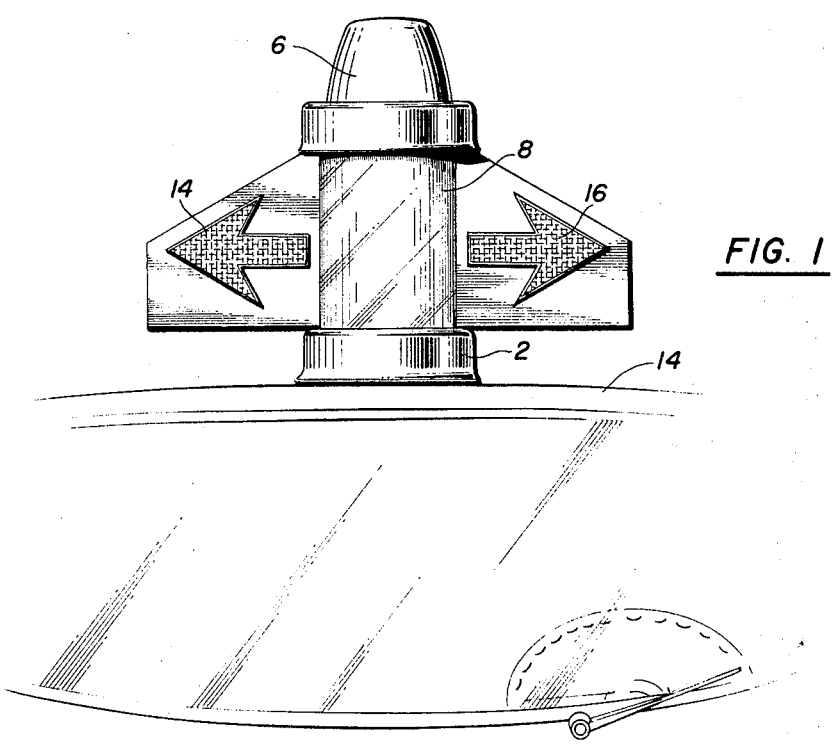
FIG. 1
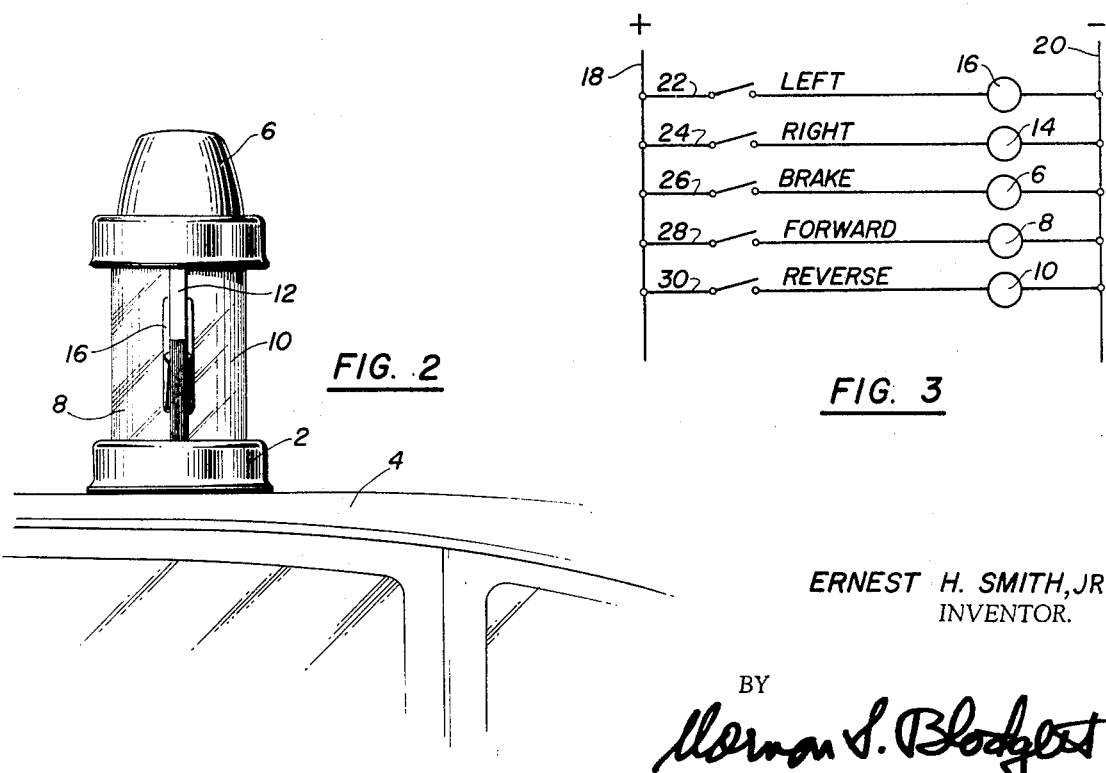
FIG. 2
FIG. 3
ERNEST H. SMITH, JR.
INVENTOR.
BY
Norman S. Blodgett

United States Patent Office 3,518,624
Patented June 30, 1970

3,518,624
COMBINATION SIGNAL LIGHT FOR MOTOR VEHICLES
Ernest H. Smith, Jr., 600 Lincoln St.,
Worcester, Mass. 01605
Filed Oct. 18, 1967, Ser. No. 676,230
Int. Cl. B60q 1/26, 1/34
U.S. Cl. 340—87                                                7 Claims

ABSTRACT OF THE DISCLOSURE

This invention relates generally to a combination signal light for motor vehicles and in particular to a combination signal light mounted on the roof of a motor vehicle as an indication to other drivers and pedestrians in front, in back or on either side of the vehicle the present and intended movement of the vehicle.

In a preferred embodiment of the invention, the signal light comprises:
(a) A base mounted on the roof of a motor vehicle;
(b) An indicator mounted on the base and facing in the forward direction of the motor vehicle;
(c) An indicator mounted on the base and facing to the rear of the motor vehicle;
(d) An opaque partitioning vane extending transversely through the light between the rear and front indicators;
(e) A stop indicator mounted as the dome over the rear and front indicators; and
(f) Right and left direction indicators mounted on the vane and facing to the rear and front of the vehicle.

BACKGROUND OF THE INVENTION

Signal lights for motor vehicles are known in the prior art such as those disclosed in U.S. Pats. 1,761,519; 2,474,610; 2,831,176; 3,073,922; 3,188,608 and Reissue 23,719, the disclosures of which are incorporated herein.

The problems faced by drivers of motor vehicles have always been difficult and are becoming more difficult because of the increasing number of individual drivers contributing to the complexity of automobile traffic. An individual driver or pedestrian has to take into account not only his own intentions, but must anticipate the intentions of drivers in proximity to him. It is therefore advantageous to know the present movement and intended changes in movement of drivers.

A combination signal light for motor vehicles which is visible from all directions and would provide an indication of the forward, rearward, left, right, stop and go movements of a motor vehicle would fulfill a definite need. None of the prior art patents recited above disclose such a signal light.

DESCRIPTION OF THE INVENTION

It is therefore an object of the present invention to provide a signal light mounted on the top of a motor vehicle so that it may be viewed from any direction.

Another object of the invention is to provide a signal light with lights facing forward and backward that indicate to an individual viewer that he is facing the front, rear or side of the motor vehicle.

Still another object of the invention is to provide a dome stop light visible in all directions.

Other objects of the invention are the combination of left and right indicating lights with forward and rearward facing lights and a dome stop light.

A further object of the invention is an opaque partition between the front and rear facing lights so that interfering light radiation will not pass through from one light to the other.

Still further objects and the broad concept of the invention will become obvious from a reading of the specification and claims and from an inspection of the accompanying drawings, in which:

FIG. 1 is a fragmentary view of a motor vehicle as seen from in front, with the combination signal mounted on the top thereof;

FIG. 2 is a fragmentary view of the same motor vehicle and combination signal as seen from the left side; and FIG. 3 is a schematic wiring diagram for the preferred embodiment of the invention shown in FIGS. 1 and 2.

As shown in FIGS. 1 and 2, the combination signal light has a base 2 mounted on the roof 4 of a motor vehicle. The base may extend through a hole bored in the roof and the required electrical conductors are suitably passed through a front corner post to the instrument panel for connection with the brake mechanism, forward and reverse gear shift mechanisms and manual turn indicators.

The dome stop light 6, visible from all directions, would be red or an appropriate color permitted by local traffic regulations. The dome stop light would be actuated by the braking mechanism and would broadcast in all directions that the vehicle was about to stop.

The lower cylindrical portion is formed of front and rear halves 8 and 10 of different colors such as yellow and white respectively, although other legally permissible colors could be used. Illuminating means, such as light bulbs within the forward and rearward indicators, could be actuated by switches connected to the forward and reverse gear shifting mechanism respectively, and for added effect a blinker switch could be installed in the lines of the circuits. Alternatively the forward and rearward indicators could be actuated individually or in combination by manual switches with or without a blinker switch in the circuit.

An opaque partitioning vane or flange 12 extends transversely through the cylindrical portion so that those who are in front or behind the vehicle are able to tell which way the vehicle is moving by observing the color of the light, while those who are at either side can tell by the relative directions of the two lights which way the vehicle is headed.

In an alternative form, the vane or flange 12 is extended in opposite directions beyond the cylindrical portion and is provided with directional indicators 14, 16 which would generally be white if viewed from in front and red if viewed from behind for use as turn signals, and are controlled in the usual manner from the drivers seat. By having these turn indicators on top of the vehicle, they are visible not only from immediately in front and behind, but also from greater distances with other vehicles in between.

With particular reference to FIG. 3, positive and negative lines 18 and 20 respectively are shown. In left turn line 22 the LEFT hand switch completes the circuit through the indicator 16. Right turn line 24 contains the RIGHT hand switch which completes the circuit through the indicator 14. Conventional blinker switches are normally present in the lines 22 and 24. The indicators 14, 16 may be illuminated by a single bulb each or if an opaque transverse partition is present separate bulbs are necessary for the rear and front facing indicators.

The dome stop light 6 is normally actuated in line 26 by the BRAKE actuated switch.

The forward and rearward indicator lines 28 and 30 are actuated by FORWARD and REVERSE switches which are hand actuated individually or in combination, or are connected to the forward or reverse gear shifting controls. Conventional blinker switches may be inserted in the lines 28 and 30 to accentuate the effect.

What is claimed is:

1. A combination of motor vehicle signal light comprising:
   (a) a base mounted on the roof of a motor vehicle,
   (b) a first indicator including a lighted semi-cylindrical lamp of a first color mounted on said base and facing in the forward direction of the motor vehicle,
   (c) a second indicator including a lighted semi-cylindrical lamp of a second color, mounted on said base and facing to the rear of the motor vehicle, said first and second indicators together forming a cylinder with a vertical axis,
   (d) an opaque partitioning vane extending transversely between said rear and forward indicators, and
   (e) a stop indicator mounted as a dome light of a third color over said rear and forward indicators and operatively connected to the brake of the motor vehicle, for actuation with the brakes said stop indicator closing the top of said cylinder, and
   (f) actuator means for operating only one of said first and second indicator lights at any one time for respectively indicating intended forward and rearward movement of the vehicle.

2. The signal light of claim 1, further comprising right and left direction indicators mounted respectively on opposite sides of and extending from said vane and facing to the rear and front of the vehicle, said vane and right and left indicators forming shield means preventing viewing of said rear indicator and said forward indicator from respectively the front and rear of the vehicle.

3. The signal light of claim 2, wherein said right and left direction indicators are operatively connected to manually operated switches.

4. The signal light of claim 3, wherein said first and second indicators are operatively connected to the forward and reverse gear shift controls of the motor vehicle respectively.

5. The signal light of claim 3, wherein said first and second indicators are connected to individual manually operated switches.

6. The signal light of claim 4, further comprising blinking switches operatively connected to said first and second indicators.

7. The signal light of claim 5, wherein said manually operated switches are combined in a single switch.

References Cited

UNITED STATES PATENTS

| | | | |
|---|---|---|---|
| 1,843,956 | 2/1932 | Otte | 340—84 X |
| 2,095,352 | 10/1937 | Verreault | 340—139 |
| 2,905,925 | 9/1959 | Whiteneck | 340—84 |
| 3,188,608 | 6/1965 | Clarke. | |

THOMAS B. HABECKER, Primary Examiner

M. SLOBASKY, Assistant Examiner

U.S. Cl. X.R.

340—84.